(12) United States Patent
Liu

(10) Patent No.: US 12,732,583 B2
(45) Date of Patent: Sep. 8, 2026

(54) INFORMATION PROCESSING APPARATUS, NON-TRANSITORY COMPUTER READABLE MEDIUM, AND METHOD FOR SELECTING BETWEEN POWER-OFF STATES IN ACCORDANCE WITH A TYPE OF ERROR

(71) Applicant: FUJIFILM BUSINESS INNOVATION CORP., Tokyo (JP)

(72) Inventor: Binhui Liu, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/178,614

(22) Filed: Mar. 6, 2023

(65) Prior Publication Data

US 2024/0106960 A1 Mar. 28, 2024

(30) Foreign Application Priority Data

Sep. 27, 2022 (JP) ................................ 2022-153294

(51) Int. Cl.
*H04N 1/32* (2006.01)

(52) U.S. Cl.
CPC . *H04N 1/32667* (2013.01); *H04N 2201/0094* (2013.01)

(58) Field of Classification Search
None
See application file for complete search history.

(56) References Cited

U.S. PATENT DOCUMENTS

2015/0039937 A1* 2/2015 Yamashita .......... G06F 11/0721 714/10

FOREIGN PATENT DOCUMENTS

JP 2008-006717 A 1/2008
JP 2015-032103 A 2/2015
JP 2015-168060 A 9/2015

OTHER PUBLICATIONS

May 12, 2026 Office Action issued in Japanese Patent Application No. 2022-153294.

* cited by examiner

*Primary Examiner* — Andrew H Lam
(74) *Attorney, Agent, or Firm* — Oliff PLC

(57) ABSTRACT

An information processing apparatus includes a processor. A first power-off state, which accompanies a reset of hardware and a restart of a program, and a second power-off state, which does not accompany the reset of the hardware and the restart of the program, are defined as states of a power supply of the information processing apparatus. The processor is configured to change, if an operation for turning off the information processing apparatus is performed after an error occurs in the information processing apparatus, a state of the power supply to the first power-off state or the second power-off state in accordance with a type of error that has occurred in the information processing apparatus.

7 Claims, 4 Drawing Sheets

FIG. 1

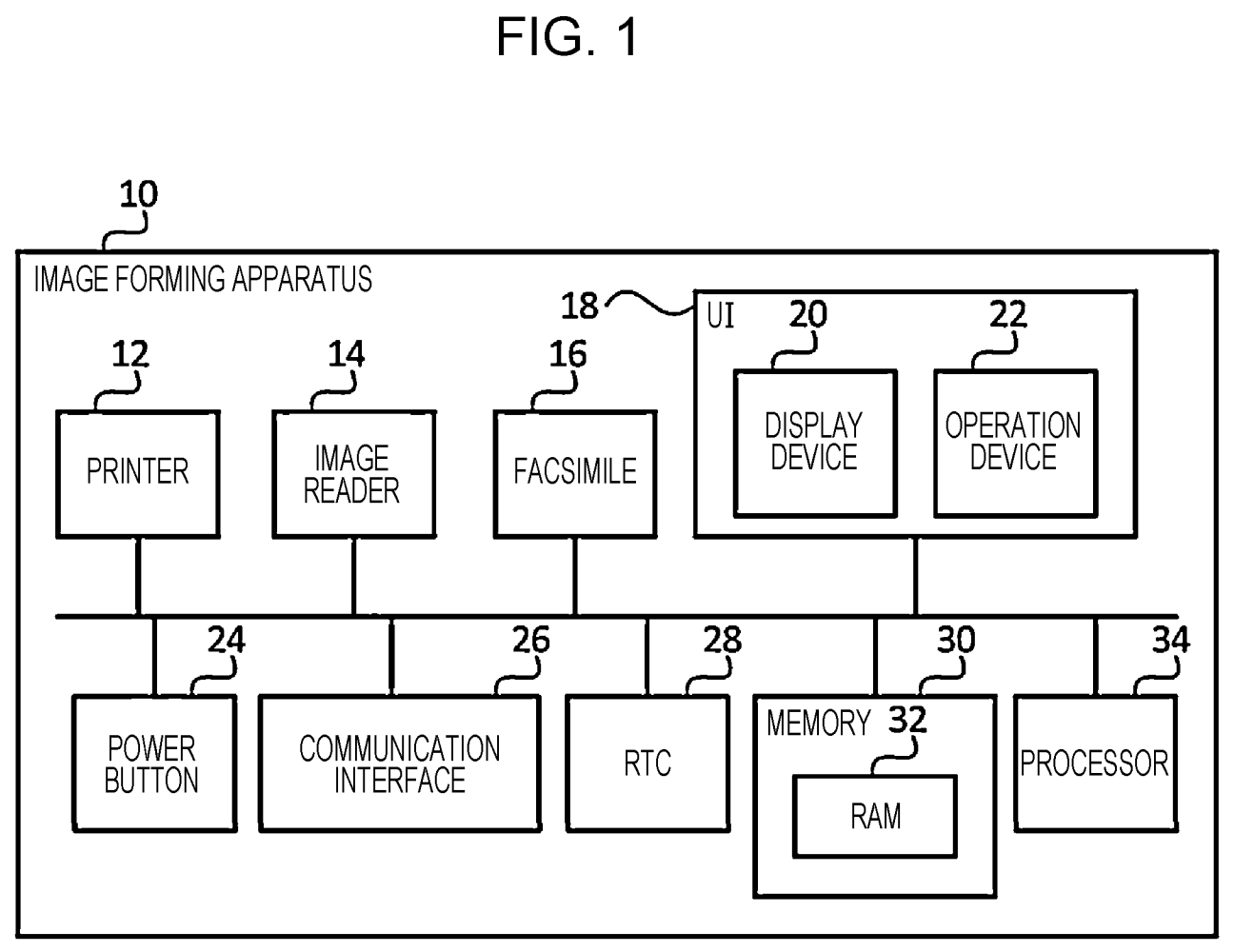

10
IMAGE FORMING APPARATUS
12
PRINTER
14
IMAGE READER
16
FACSIMILE
18
UI
20
DISPLAY DEVICE
22
OPERATION DEVICE
24
POWER BUTTON
26
COMMUNICATION INTERFACE
28
RTC
30
MEMORY
32
RAM
34
PROCESSOR

FIG. 4

| ERROR CODE | ERROR TYPE | FAST ACTIVATION |
|---|---|---|
| 111−001 | CONTROLLER SOFTWARE ERROR | NO |
| 111−002 | UNAUTHORIZED MEMORY ACCESS | NO |
| 111−003 | FILE DESCRIPTOR EXHAUSTION | NO |
| 001−001 | FRONT COVER OPEN | YES |
| 002−001 | LOW CYAN TONER WARNING | YES |
| 002−002 | LOW YELLOW TONER WARNING | YES |
| 002−003 | LOW MAGENTA TONER WARNING | YES |
| 002−004 | LOW BLACK TONER WARNING | YES |
| 005−001 | NO NETWORK CONNECTION | YES |

FIG. 5

| ERROR CODE | ERROR TYPE | FAST ACTIVATION | CHANGE |
|---|---|---|---|
| 111–001 | CONTROLLER SOFTWARE ERROR | NO | NO |
| 111–002 | UNAUTHORIZED MEMORY ACCESS | NO | NO |
| 111–003 | FILE DESCRIPTOR EXHAUSTION | NO | NO |
| 111–004 | FACSIMILE CARD MALFUNCTION | NO | YES |
| 001–001 | FRONT COVER OPEN | YES | NO |
| 002–001 | LOW CYAN TONER WARNING | YES | NO |
| 002–002 | LOW YELLOW TONER WARNING | YES | NO |
| 002–003 | LOW MAGENTA TONER WARNING | YES | NO |
| 002–004 | LOW BLACK TONER WARNING | YES | NO |
| 005–001 | NO NETWORK CONNECTION | YES | YES |

INFORMATION PROCESSING APPARATUS, NON-TRANSITORY COMPUTER READABLE MEDIUM, AND METHOD FOR SELECTING BETWEEN POWER-OFF STATES IN ACCORDANCE WITH A TYPE OF ERROR

CROSS-REFERENCE TO RELATED APPLICATIONS

This application is based on and claims priority under 35 USC 119 from Japanese Patent Application No. 2022-153294 filed Sep. 27, 2022.

BACKGROUND

(i) Technical Field

The present disclosure relates to an information processing apparatus, a non-transitory computer readable medium, and a method.

(ii) Related Art

Japanese Unexamined Patent Application Publication No. 2015-168060 describes an image processing apparatus including a first device and a second device. When the first device detects an input of an instruction to turn off the image processing apparatus, the first device performs, if a process for establishing a suspended state can be performed in order to stop supplying power to the second device, the process for establishing the suspended state and performs, if it is difficult to perform the process for establishing the suspended state, a shutdown process. If an error occurs while the process for establishing the suspended state is being performed, error information regarding the error is generated and registered to a memory.

SUMMARY

A first power-off state, which accompanies a reset of hardware and a restart of programs, and a second power-off state, which does not accompany the reset of hardware and the restart of the programs, might be defined as states of a power supply of an apparatus. In general, time taken, when a power supply is in the second power-off state, to restore hardware included in an apparatus after an operation for turning on the apparatus is performed is shorter than time taken, when the power supply is in the first power-off state, to restore the hardware after an operation for turning on the apparatus is performed.

If an operation for turning off an apparatus is performed after an error occurs in the apparatus, a state of a power supply might be invariably changed to the first power-off state. If the error is one that can be eliminated by resetting hardware and restarting programs, the error can be eliminated by changing the state of the power supply to the first power-off state.

If an error that has occurred in the apparatus is one that can be eliminated by changing the state of the power supply to the second power-off state, however, time taken to restore the apparatus becomes longer, if the state of the power supply is invariably changed to the first power-off state, than when the state of the power supply is changed to the second power-off state.

Aspects of non-limiting embodiments of the present disclosure relate to reduction of, when a first power-off state, which accompanies a reset of hardware and a restart of programs, and a second power-off state, which does not accompany the reset of the hardware and the restart of the programs, are defined as states of a power supply of an apparatus, time taken to restore the apparatus after an operation for turning on the apparatus is performed, compared to when a state of the power supply is invariably changed to the first power-off state after an error occurs in the apparatus and an operation for turning off the apparatus is performed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor, wherein a first power-off state, which accompanies a reset of hardware and a restart of a program, and a second power-off state, which does not accompany the reset of the hardware and the restart of the program, are defined as states of a power supply of the information processing apparatus, and wherein the processor is configured to change, if an operation for turning off the information processing apparatus is performed after an error occurs in the information processing apparatus, a state of the power supply to the first power-off state or the second power-off state in accordance with a type of error that has occurred in the information processing apparatus.

BRIEF DESCRIPTION OF THE DRAWINGS

An exemplary embodiment of the present disclosure will be described in detail based on the following figures, wherein:

FIG. 1 is a block diagram illustrating the hardware configuration of an image forming apparatus according to an exemplary embodiment;

FIG. 4 is a diagram illustrating an example of an error management table; and FIG. 5 is a diagram illustrating another example of the error management table.

DETAILED DESCRIPTION

Figure 2:
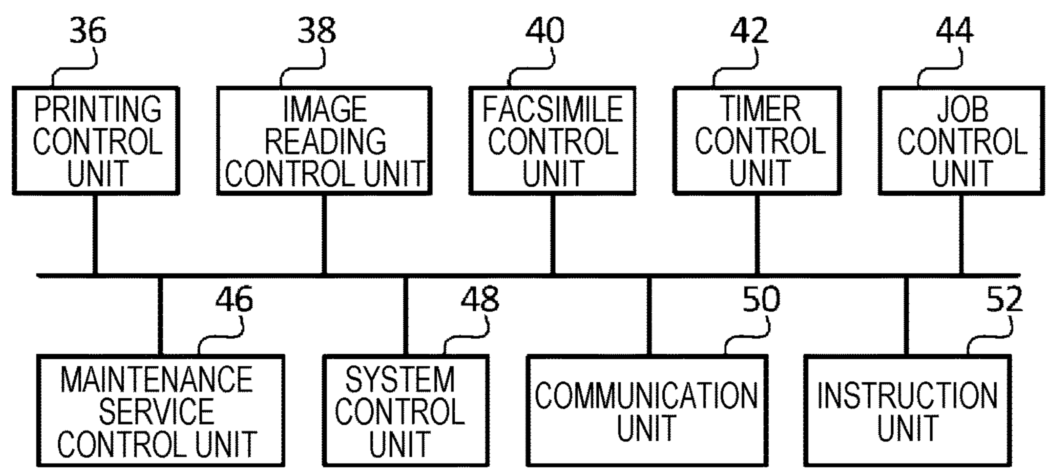
FIG. 2 is a block diagram illustrating functions of the image forming apparatus according to the exemplary embodiment.

An information processing apparatus according to an exemplary embodiment will be described hereinafter. The information processing apparatus according to the exemplary embodiment has a function of controlling supply of power thereto, and may be any apparatus having the function.

States of a power supply of the information processing apparatus (i.e., power supply states) will be described. The states of the power supply of the information processing apparatus include, for example, a power-on state, an all-power-off state, a sub-power-off state, and a suspended state. These states of the power supply are examples, and other states of the power supply may be used, instead.

The power-on state is a state where power is supplied to devices (i.e., hardware) included in the information processing apparatus and the information processing apparatus has been activated and a state where the information processing apparatus can perform processes and operations.

The all-power-off state is a state where power is not supplied to the devices included in the information processing apparatus at all and the devices are not energized at all. A state where the power supply of the information processing apparatus is unplugged, for example, corresponds to the all-power-off state.

The sub-power-off state is a state where the power supply of the information processing apparatus is plugged and a state where the information processing apparatus can be activated by performing an operation for turning on the information processing apparatus (e.g., pressing a power button). A state where power is supplied to only some of the devices included in the information processing apparatus (e.g., a memory and a device for detecting pressing of the power button) and only these devices are energized, for example, corresponds to the sub-power-off state.

In the sub-power-off state, the devices (i.e., hardware) are reset and programs (i.e., software) are restarted. When a user performs an operation for turning off the information processing apparatus (e.g., presses the power button) and the power supply enters the sub-power-off state from the power-on state, for example, the devices are reset and the programs are restarted. The devices may be reset and the programs may be restarted when the user performs an operation for turning on the information processing apparatus (e.g., presses the power button) with the power supply in the sub-power-off state to change the state of the power supply to the power-on state from the sub-power-off state, instead.

That is, the sub-power-off state is a power-off-state accompanying the reset of the devices and the restart of the programs. The programs may be restarted when the power supply enters the sub-power-off state from the power-on state or enters the power-on state from the sub-power-off state, instead. The devices may be reset, too, when the power enters the sub-power-off state from the power-on state or enters the power-on state from the sub-power-off state.

In the all-power-off state, too, the devices are reset and the programs are restarted. The all-power-off state, therefore, is a power-off state accompanying the reset of the devices and the restart of the programs. The devices may be reset and the programs may be restarted when the power enters the all-power-off state from the power-on state or enters the power-on state from the all-power-off state, instead. When an operation for turning off the information processing apparatus is performed, for example, the power supply enters the sub-power-off sate from the power-on state. The devices are reset and the programs are restarted at this time. The power supply then enters the all-power-off state when the power supply is unplugged. The devices may be reset and the programs may be restarted after an operation for turning on the information processing apparatus is performed, instead.

When an operation for turning on the information processing apparatus is performed (e.g., the power button is pressed) with the power supply in the sub-power-off state, the power supply is restored to the power-on state from the sub-power-off state, and the information processing apparatus is activated.

The suspended state is a state of the power supply achieved by executing a suspension function of the information processing apparatus. The suspended state is a state where the power supply of the information processing apparatus is plugged and a state where the information processing apparatus can be activated by performing an operation for turning on the information processing apparatus (e.g., pressing the power button). A state where power is supplied to only some of the devices included in the information processing apparatus (e.g., the memory and the device for detecting pressing of the power button) and only these devices are energized, for example, corresponds to the suspended state. Power necessary to hold data is supplied to the memory.

In the suspended state, unlike in the sub-power-off state, the devices are not reset and the programs are not restarted. That is, the suspended state can be regarded as a power-off state that does not accompany the reset of the devices and the restart of the programs.

When an operation for turning off the information processing apparatus is performed (e.g., the power button is pressed) and the power supply enters the suspended state from the power-on state, information indicating states of programs executed before the power supply enters the suspended state (i.e., states of programs executed before an operation for turning off the information processing apparatus is performed) is stored in a memory (e.g., a random-access memory (RAM)).

When an operation for turning on the information processing apparatus is performed (e.g., the power button is pressed) with the power supply in the suspended state, the power supply is restored to the power-on state from the suspended state, and the information processing apparatus is activated. At this time, the programs are not restarted and are restored to states stored in the memory. As a result, time taken to restore the power supply becomes shorter than when the power supply is restored to the power-on state. In this sense, the suspension function can be regarded as a fast activation function (i.e., a function of activating the information processing apparatus fast) or a fast restoration function.

In the following description, the power-off state accompanying the reset of the devices and the restart of the programs will be referred to as a "first power-off state", and the power-off state that does not accompany the reset of the devices and the restart of the programs will be referred to as a "second power-off state". In the case of the above example, the all-power-off state and the sub-power-off state correspond to examples of the first power-off state, and the suspended state corresponds to an example of the second power-off state. The above-described states of the power supply are examples, and the power-off state accompanying the reset of the devices and the restart of the programs is defined as the first power-off state and the power-off state that does not accompany the reset of the devices and the restart of the programs is defined as the second power-off state.

In the information processing apparatus according to the present exemplary embodiment, if an operation for turning off the information processing apparatus is performed after an error occurs in the information processing apparatus, the power supply enters the first power-off state or the second power-off state in accordance with a type of error.

If an error that has occurred in the information processing apparatus is one that can be eliminated by changing the state of the power supply to the first power-off state (i.e., the power-off state accompanying the reset of the devices and the restart of the programs), for example, the power supply enters the first power-off state.

If an error that has occurred in the information processing apparatus is one that cannot be eliminated by changing the state of the power supply to the first power-off state, on the other hand, the power supply enters the second power-off state (i.e., the power-off state that does not accompany the reset of the devices and the restart of the programs).

In the following description, an error that can be eliminated by changing the state of the power supply to the first power-off state will be referred to as a "non-fast activation error", and an error that cannot be eliminated by changing the state of the power supply to the first power-off state will be referred to as a "fast activation error". If a non-fast activation error occurs, the power supply enters the first power-off state. If a fast activation error occurs, the power supply enters the second power-off state. As described above, the suspended state is an example of the second power-off state, and the suspended state is a state where faster activation than in the first power-off state can be performed.

That is, if an error that can be eliminated by changing the state of the power supply to the first power-off state occurs, the error is eliminated by changing the state of the power supply to the first power-off state. In the sense that the power supply does not enter the second power-off state, the error corresponds to a non-fast activation error.

If an error that cannot be eliminated by changing the state of the power supply to the first power-off state occurs, the error is not eliminated by changing the state of the power supply to the first power-off state. The power supply, therefore, enters the second power-off state in order to achieve fast activation. In this sense, the error corresponds to a fast activation error.

An exemplary embodiment will be described hereinafter while taking an image forming apparatus as an example of the information processing apparatus, but an apparatus according to the exemplary embodiment is not limited to the image forming apparatus. The present exemplary embodiment may be applied to an apparatus other than the image forming apparatus, instead.

FIG. 1 illustrates the hardware configuration of an image forming apparatus 10, which is an example of the information processing apparatus. The image forming apparatus 10 includes, for example, a printer 12, an image reader 14, a facsimile 16, a user interface (UI) 18, a power button 24, a communication interface 26, a real-time clock (RTC) 28, a memory 30, and a processor 34.

The printer 12 prints images on a recording medium such as sheets of paper. A printing method is not particularly limited, and may be electrophotography, an inkjet method, or the like. The image reader 14 is a scanner, for example, and reads images from sheets of paper or the like. The printer 12 and the image reader 14 together achieve a copying function. The facsimile 16 transmits and receives information using a facsimile function. Although the image forming apparatus 10 includes the printer 12, the image reader 14, and the facsimile 16 in the example illustrated in FIG. 1, the image forming apparatus 10 may include at least the printer 12, the image reader 14, or the facsimile 16, instead. The image forming apparatus 10 may be a multi-function device including some of the printer 12, the image reader 14, and the facsimile 16, instead.

The UI 18 includes, for example, a display device 20 and an operation device 22. The display device 20 is a liquid crystal display, an electroluminescent (EL) display, or the like. The operation device 22 is a keyboard, a mouse, an input key, an operation panel, or the like. The UI 18 may be a touch panel, instead.

The power button 24 is a button for turning on and off the image forming apparatus 10.

As described above, as the states of the power supply of the image forming apparatus 10, for example, the power-on state, the all-power-off state, the sub-power-off state, and the suspended state are defined.

In the suspended state, power is supplied to only the device for detecting pressing of the power button 24 and the RAM 32. Power necessary to hold data is supplied to the RAM 32. When the power supply enters the suspended state from the power-on state, information indicating states of programs executed before the power supply enters the suspended state (i.e., states of programs executed before the power button 24 is pressed) is stored in the RAM 32. When the power button 24 is pressed and the pressing is detected with the power supply in the suspended state, the power supply is restored to the power-on state from the suspended state, and the image forming apparatus 10 is activated. At this time, the programs are not restarted, and are restored to the states stored in the RAM 32.

If the power button 24 is pressed with the power supply of the image forming apparatus 10 in the power-on state, the power supply of the image forming apparatus 10 enters the first power-off state or the second power-off state from the power-on state. For example, the power supply of the image forming apparatus 10 enters the sub-power-off state or the suspended state from the power-on state.

If the power button 24 is pressed with the power supply of the image forming apparatus 10 in the first power-off state or the second power-off state, the power supply of the image forming apparatus 10 enters the power-on state from the first power-off state or the second power-off state. If the power button 24 is pressed with the power supply of the image forming apparatus 10 in the sub-power-off state, the power supply of the image forming apparatus 10 enters the power-on state from the sub-power-off state. If the power button 24 is pressed with the power supply of the image forming apparatus 10 in the suspended state, the power supply of the image forming apparatus 10 enters the power-on state from the suspended state. More specifically, a process for restoring the devices and a process for restoring the programs are performed. In the process for restoring the devices, power is supplied to the devices. When power is supplied to the devices and the devices have been restored, the devices can be used. In the process for restoring the programs, the programs are activated. When the programs have been activated, the programs can be used. In the suspended state, the programs are restored to states stored in the RAM 32.

The communication interface 26 includes a communication chip, a communication circuit, or the like and has a function of transmitting information to other apparatuses and a function of receiving information from other apparatuses. The communication interface 26 may have a wireless communication function such as near-field communication or Wi-Fi (registered trademark) or a wired communication function.

The RTC 28 generates information such as time, date, month, and year from a clock source and outputs the information.

The memory 30 is a device that serves as one or plural storage areas storing data. The memory 30 includes the RAM 32. The memory 30 also includes a boot read-only memory (ROM) storing a program for activating the image forming apparatus 10. The memory 30 may also include a hard disk drive (HDD), a solid-state drive (SSD), a memory other than the RAM 32, another storage device (e.g., an optical disc), or the like.

The processor 34 controls the operation of the other components of the image forming apparatus 10. For example, the processor 34 controls printing performed by the printer 12, reading of images performed by the image reader 14, transmission and reception of information performed by the facsimile 16, and communication performed by the communication interface 26.

The processor 34 detects an error that has occurred in the image forming apparatus 10 and determines a type of error. If an operation for turning off the image forming apparatus 10 is performed (e.g., the power button 24 is pressed) after an error occurs in the image forming apparatus 10, the processor 34 changes the state of the power supply to the first power-off state or the second power-off state in accordance with a type of error.

If an error that has occurred in the image forming apparatus 10 is one that can be eliminated by changing the state of the power supply to the first power-off state, the processor 34 changes the state of the power supply to the first power-off state. That is, if an error that has occurred in the image forming apparatus 10 is a non-fast activation error, the processor 34 changes the state of the power supply to the first power-off state.

If an error that has occurred in the image forming apparatus 10 is one that cannot be eliminated by changing the state of the power supply to the first power-off state, the processor 34 changes the state of the power supply to the second power-off state. That is, if an error that has occurred in the image forming apparatus 10 is a fast activation error, the processor 34 changes the state of the power supply to the second power-off state.

The memory 30 stores, for example, error management information. The error management information indicates whether an error that has occurred in the image forming apparatus 10 is a fast activation error. That is, the error management information indicates whether an error that has occurred in the image forming apparatus 10 is one that can be eliminated by changing the state of the power supply to the first power-off state or one that cannot be eliminated by changing the state of the power supply to the second power-off state. In other words, the error management information indicates, in accordance with a type of error, whether to change the state of the power supply to the first power-off state or the second power-off state.

The processor 34 refers to the error management information and determines whether an error that has occurred in the image forming apparatus 10 is a fast activation error. That is, the processor 34 determines, by referring to the error management information, whether to change the state of the power supply to the first-power off state or the second power-off state.

The printer 12, the image reader 14, the facsimile 16, the UI 18, the power button 24, the communication interface 26, the RTC 28, the memory 30, and the processor 34 each correspond to an example of the device included in the image forming apparatus 10.

FIG. 2 illustrates an example of functions of the image forming apparatus 10.

A printing control unit 36 controls printing performed by the printer 12. An image reading control unit 38 controls reading of images performed by the image reader 14. A facsimile control unit 40 controls transmission and reception of information performed by the facsimile 16. A timer control unit 42 manages time on the basis of outputs of the RTC 28. A job control unit 44 controls execution of jobs (e.g., print jobs) executed by the image forming apparatus 10. A maintenance service control unit 46 controls execution of a maintenance service for the image forming apparatus 10 and the like. A system control unit 48 controls a whole system of the image forming apparatus 10. A communication unit 50 performs communication using the communication interface 26. An instruction unit 52 receives various instructions and outputs the instructions to relevant components.

Figure 3:
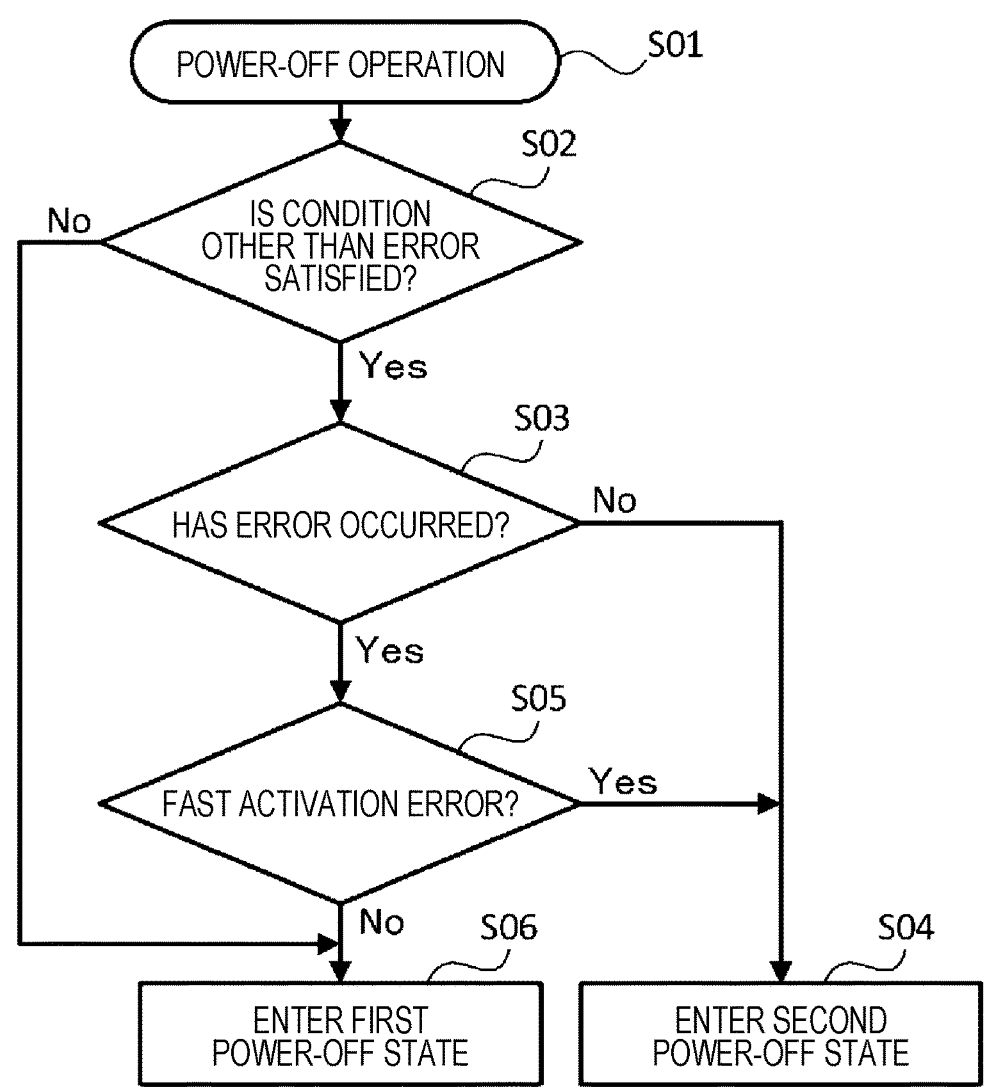
FIG. 3 is a flowchart illustrating how the image forming apparatus according to the exemplary embodiment operates.

An operation performed by the image forming apparatus 10 will be described hereinafter with reference to FIG. 3. FIG. 3 is a flowchart illustrating how the image forming apparatus 10 operates.

When the power supply of the image forming apparatus 10 is in the power-on state, the user performs an operation for turning off the image forming apparatus 10 (S01). More specifically, the user presses the power button 24.

When the user performs the operation for turning off the image forming apparatus 10, the processor 34 determines whether a condition, other than an error, for changing the state of the power supply to the second power-off state is satisfied (S02). The condition is determined in advance.

If the condition is not satisfied (No in S02), the processor 34 changes the state of the power supply to the first power-off state (S06). That is, since the condition for changing the state of the power supply to the second power-off state is not satisfied, the processor 34 changes the state of the power supply to the first power-off state. For example, the processor 34 changes the state of the power supply to the sub-power-off state. If an operation for turning on the image forming apparatus 10 is performed (i.e., the power button 24 is pressed) in this state, the power supply is restored to the power-on state from the first power-off state (e.g., the sub-power-off state), and the image forming apparatus 10 is activated. The devices are reset and the programs are restarted when the power supply enters the sub-power-off state or enters the power-on state from the sub-power-off state.

If the condition is satisfied (Yes in S02), the processor 34 determines whether an error has occurred in the image forming apparatus 10 (S03).

If an error has not occurred in the image forming apparatus 10 (No in S03), the processor 34 changes the state of the power supply to the second power-off state (S04). For example, the processor 34 changes the state of the power supply to the suspended state. As a result, information indicating states of the programs is stored in the RAM 32, and power is supplied to only the device for detecting pressing of the power button 24 and the RAM 32. If an operation for turning on the image forming apparatus 10 (i.e., the power button 24 is pressed) in this state, the power supply is restored to the power-on state from the second power-off state (e.g., the suspended state). The programs are not restarted and are restored to the states stored in the RAM 32. The devices are not reset.

If an error has occurred in the image forming apparatus 10 (Yes in S03), the processor 34 determines whether the error is a fast activation error (S05). For example, the processor 34 refers to the error management information stored in the memory 30 and determines whether the error is a fast activation error.

If the error that has occurred in the image forming apparatus 10 is a fast activation error (Yes in S05), the processor 34 changes the state of the power supply to the second power-off state (S04). That is, since the error that has occurred in the image forming apparatus 10 is one that cannot be eliminated by changing the state of the power supply to the first power-off state, the processor 34 changes the state of the power supply to the second power-off state. In other words, since the error that has occurred in the image forming apparatus 10 is one that cannot be eliminated by resetting the devices and the restarting the programs, the processor 34 changes the state of the power supply to the second power-off state.

If the error that has occurred in the image forming apparatus 10 is not a fast activation error (No in S05), the processor 34 changes the state of the power supply to the first power-off state (S06). That is, since the error that has occurred in the image forming apparatus 10 is one that can be eliminated by changing the state of the power supply to the first power-off state, the processor 34 changes the state of the power supply to the first power-off state. In other words, since the error that has occurred in the image forming apparatus 10 is one that can be eliminated by resetting the devices and restarting the programs, the processor 34 changes the state of the power supply to the first power-off state.

Examples will be described hereinafter with reference to FIG. 4. FIG. 4 illustrates an example of the error management table. The error management table is an example of the above-described error management table and stored in the memory 30.

In the error management table, an error code, information indicating a type of error, and information indicating whether to perform fast activation are associated with one another for each of errors that can occur in the image forming apparatus 10.

The error code is an example of information for identifying an error. The type of error is content of an error that has occurred in the image forming apparatus 10.

The information indicating whether to perform fast activation is information indicating whether an error that has occurred in the image forming apparatus 10 is a fast activation error. That is, the information indicating whether to perform fast activation is information indicating whether an error that has occurred in the image forming apparatus 10 is one that can be eliminated by changing the state of the power supply to thee first power-off state. An error associated with "No" in FIG. 4 is a non-fast activation error, that is, an error that can be eliminated by changing the state of the power supply to the first power-off state. An error associated with "Yes" in FIG. 4 is a fast activation error, that is, an error that cannot be eliminated by changing the state of the power supply to the first power-off state.

If an operation for turning off the image forming apparatus 10 is performed (i.e., the power button is pressed) after an error occurs in the image forming apparatus 10, the processor 34 refers to the error management table and determines whether the error is a fast activation error. The processor 34 changes the state of the power supply to the first power-off state or the second power-off state in accordance with a result of the determination.

First Example

If an operation for turning off the image forming apparatus 10 is performed after an error of unauthorized memory access (i.e., an error whose error code is "111-002") occurs in the image forming apparatus 10, the processor 34 refers to the error management table and determines whether the error is a fast activation error. In order to eliminate the error of unauthorized memory access, the programs need to be restarted. The error of unauthorized memory access, therefore, is registered in the error management table as a non-fast activation error. The processor 34 determines that the error of unauthorized memory access is a non-fast activation error. In this case, the processor 34 changes the state of the power supply to the first power-off state (e.g., the sub-power-off state), which accompanies the reset of the devices and the restart of the programs.

When an operation for turning on the image forming apparatus 10 is performed thereafter, the programs are restarted. As a result, the error of unauthorized memory access is eliminated. Alternatively, the programs may be restarted when the power supply enters the first power-off state.

Second Example

An error of a low cyan toner warning (i.e., an error whose error code is "002-001") is an error that cannot be eliminated by resetting the devices and restarting the programs. That is, an error caused by low cyan toner is not eliminated by resetting the devices or restarting the programs, unless cyan toner is refilled. The error of a low cyan toner warning, therefore, is registered in the error management table as a fast activation error. If the error of a low cyan toner warning occurs in the image forming apparatus 10, the processor 34 determines that the error is a fast activation error. In this case, the processor 34 changes the state of the power supply to the second power-off state (e.g., the suspended state), which does not accompany the reset of the devices and the restart of the programs. Information indicating states of the programs is stored in the RAM 32.

If an operation for turning on the image forming apparatus 10 is performed thereafter, the power supply enters the power-on state from the second power-off state. The programs are restored to the states stored in the RAM 32. Since the devices are not reset and the programs are not restarted, time taken to activate the image forming apparatus 10 is shorter than when the image forming apparatus 10 is activated from the first power-off state. Although the error of a low cyan toner warning is not eliminated, fast activation of the image forming apparatus 10 is achieved.

Even when the amount of cyan toner remaining is too small to perform printing that uses the cyan toner (e.g., color printing), printing that does not use the cyan toner (e.g., monochrome printing) might be performed. Since fast activation of the image forming apparatus 10 is achieved by changing the state of the power supply to the second power-off state, the printing that does not use the cyan toner can be performed more rapidly.

Third Example

When an error that can be eliminated by changing the state of the power supply to the first power-off state (i.e., non-fast activation error) and an error that cannot be eliminated by changing the state of the power supply to the first power-off state have occurred in the image forming apparatus 10 at a time of an operation for turning off the image forming apparatus 10, the processor 34 changes the state of the power supply to the first power-off state. That is, when a complex error including a non-fast activation error and a fast activation error has occurred, the processor 34 changes the state of the power supply to the first power-off state.

It is assumed, for example, that, at a time of an operation for turning off the image forming apparatus 10, the error of unauthorized memory access and the error of a low cyan toner warning have occurred in the image forming apparatus 10. The error of a low cyan toner warning is a fast activation error, whereas the error of unauthorized memory access is non-fast activation error. The processor 34, therefore, changes the state of the power supply to not the second power-off state but the first power-off state. As a result, the devices are reset and the programs are restarted. Consequently, when an operation for turning on the image forming apparatus 10 is performed, the image forming apparatus 10 is activated with the error of unauthorized memory access having been eliminated.

As described above, by changing the state of the power supply to the first power-off state after a complex error occurs, a non-fast activation error is eliminated.

Fourth Example

When an error that can be eliminated by changing the state of the power supply to the first power-off state (e.g., a non-fast activation error) has successively occurred in the image forming apparatus 10, the processor 34 suggests to the user, in accordance with a condition of operations for turning off and on the image forming apparatus 10, that the state of the power supply be changed to the second power-off state even if a non-fast activation error occurs.

A case where a non-fast activation error has successively occurred in the image forming apparatus 10 is, for example, a case where the number of times that a non-fast activation error has occurred in a row is larger than or equal to a first threshold. The first threshold is a predetermined value and may be changed by the user.

A case where a non-fast activation error has successively occurred in predetermined unit periods for a predetermined period of time and the number of times that the non-fast activation error has occurred in a row is larger than or equal to the first threshold may be a case where a non-fast activation error has successively occurred in the image forming apparatus 10. The predetermined period of time is, for example, one week or one month. The unit period is a period included in the predetermined period of time and is, for example, one day. A case where a non-fast activation error has occurred every day for a month, for example, is an example of the case where a non-fast activation error has successively occurred in the image forming apparatus 10.

Here, an operation for turning off the image forming apparatus 10 and an operation for turning on the image forming apparatus 10 are defined as a single off-on operation set. The condition of operations for turning off and on the image forming apparatus 10 is a condition of execution of the operation set. Execution of the operation set in each unit period and a time interval between execution of the operation set and next execution of the operation set, for example, are examples of the condition of execution of the operation set.

If a non-fast activation error has successively occurred in the image forming apparatus 10 and the number of times that the operation set has been performed in a row for the predetermined period of time is larger than or equal to a second threshold (i.e., the number of times that a combination of the operation for turning off the image forming apparatus 10 and the operation for turning on the image forming apparatus 10 has been performed is larger than or equal to the second threshold), for example, the processor 34 suggests that the state of the power supply be changed to the second power-off state even if a non-fast activation error occurs. The second threshold is a predetermined value and may be changed by the user.

When a non-fast activation error has occurred every day for a month and the user has performed the operation set every day for the month (i.e., the user has turned off and then on the image forming apparatus 10 every day), for example, the processor 34 suggests to the user that the state of the power supply be changed to the second power-off state even if a non-fast activation error occurs.

As the suggestion to the user, for example, the processor 34 displays, on the display device 20, information (e.g., a message) indicating that the power supply is to enter the second power-off state, outputs the information from a speaker as a sound, or transmits the information to the user's terminal apparatus (e.g., a personal computer or a smartphone).

If the user operates, in response to the suggestion, the UI 18 or the like to give an instruction to change the state of the power supply to the second power-off state, the processor 34 registers the non-fast activation error to the error management table as a fast activation error. As a result, the error will be processed as a fast activation error. If the error occurs the next time and an operation for turning off the image forming apparatus 10 is performed, therefore, the processor 34 changes the state of the power supply to the second power-off state.

If a condition that will be described hereinafter is satisfied, the processor 34 may suggest to the user that the state of the power supply be changed to the second power-off state.

If an error that has occurred in the image forming apparatus 10 is one with which the image forming apparatus 10 can perform a process with the power supply in the second power-off state, for example, the processor 34 suggests to the user that the state of the power supply be changed to the second power-off state even if a non-fast activation error occurs. That is, if a non-fast activation error that has occurred in the image forming apparatus 10 is one that does not affect execution of a process to be performed by the image forming apparatus 10, the processor 34 suggests to the user that the state of the power supply be changed to the second power-off state even if a non-fast activation error occurs.

The fourth example will be described in detail hereinafter with reference to FIG. 5. FIG. 5 illustrates another example of the error management table.

In the error management table illustrated in FIG. 5, an error code, information indicating a type of error, information indicating whether to perform fast activation, and information indicating whether a change may be made are associated with one another for each of errors that can occur in the image forming apparatus 10.

The information indicating whether a change may be made is information indicating whether a non-fast activation error may be changed to a fast activation error or information indicating whether a fast activation error may be changed to a non-fast activation error.

"Yes" in FIG. 5 indicates that a change may be made. "No" in FIG. 5 indicates that a change may not be made.

If "No" is associated with an error registered as a non-fast activation error, the error is one that may not be changed to a fast activation error from a non-fast activation error. Because a non-fast activation error associated with "No" can affect execution of a process to be performed by the image forming apparatus 10, the non-fast activation error is registered as an error that may not be changed to a fast activation error from a non-fast activation error. A controller software error and the error of unauthorized memory access, for example, are errors that affect a process to be performed by the image forming apparatus 10 unless the errors are eliminated. For example, the process slows down or is not performed. These errors, therefore, are registered as errors that may not be changed to fast activation errors from non-fast activation errors.

If "Yes" is associated with an error registered as a non-fast activation error, the error may be changed to a fast activation error from a non-fast activation error. A non-fast activation error associated with "Yes" is one that does not affect execution of a process to be performed by the image forming apparatus 10 or one that is unlikely to affect the execution of the process. The error, therefore, is registered as an error that may be changed to a fast activation error from a non-fast activation error. An error of a facsimile card malfunction, for example, is one that may be changed to a fast activation error from a non-fast activation error. Even when a facsimile card is malfunctioning, processes other than facsimile (e.g., printing and copying) can be performed. The error, therefore, is registered as one that may be changed to a fast activation error from a non-fast activation error.

If "No" is associated with an error registered as a fast activation error, the error may not be changed to a non-fast activation error from a fast activation error. The error is one that cannot be eliminated by changing the state of the power supply to the first power-off state. The error, therefore, is registered as one that may not be changed to a non-fast activation error from a fast activation error, in order to prioritize fast activation of the image forming apparatus 10.

If "Yes" is associated with an error registered as a fast activation error, the error may be changed to a non-fast activation error from a fast activation error.

The fourth example will be described with reference to a specific example.

When the error of a facsimile card malfunction (i.e., an error whose error code is "111-004") has occurred every day for a month and the user has performed the operation set every day for the month, the processor 34 suggests to the user that the state of the power supply be changed to the second power-off state.

More specifically, the processor 34 displays, on the display device 20, a message, "Fast activation unavailable due to the error of a facsimile card malfunction (the error code "111-004"). Enable fast activation even with this error?".

If the user operates, in response to the suggestion, the UI 18 or the like to accept the change (e.g., presses an OK button), the processor 34 changes the error of a facsimile card malfunction to a fast activation error from a non-fast activation error. That is, the processor 34 changes, from "No" to "Yes", the information indicating whether a change may be made associated with the error of a facsimile card malfunction. As a result, when the error of a facsimile card malfunction occurs the next time and the user performs an operation for turning off the image forming apparatus 10, the processor 34 changes the state of the power supply to the second power-off state. As a result, fast activation is achieved.

Even when the facsimile card is malfunctioning, processes that do not use the facsimile card (e.g., printing and copying) can be performed. In this case, by prioritizing fast activation of the image forming apparatus 10, a process such as printing or copying can be performed more rapidly.

If the user does not accept the change in response to the suggestion, the processor 34 does not change the error of a facsimile card malfunction to a fast activation error from a non-fast activation error.

Errors whose error codes are "111-001" to "111-003" are ones that can be eliminated only by changing the state of the power supply to the first power-off state. If such an error occurs, therefore, the processor 34 does not suggest to the user that the state of the power supply be changed to the second power-off state. For example, the processor 34 does not display the above message on the display device 20.

Fifth Example

If an error registered as one for which the power supply is to enter the second power-off state after an operation for turning off the image forming apparatus 10 is performed (i.e., a fast activation error) occurs, the error might not be eliminated even by changing the state of the power supply to the second power-off state. In a fifth example, in this case, the processor 34 suggests to the user that the error be registered as one that can be eliminated by changing the state of the power supply to the first power-off state.

The fifth example will be described hereinafter with reference to FIG. 5.

An error of no network connection (i.e., an error whose error code is "005-001") is registered in the error management table as a fast activation error. That is, the error is one for which the power supply is to enter the second power-off state after an operation for turning off the image forming apparatus 10 is performed.

In general, the error of no network connection can be eliminated by connecting a network cable to the image forming apparatus 10. The error of no network connection, however, might be caused as a result of occurrence of a problem in software processing performed by a network module included in the image forming apparatus 10. In this case, the error of no network connection is not eliminated even if a network cable is properly connected. In order to eliminate the error, the programs need to be restarted.

If the error of no network connection is not eliminated by performing an operation for turning off the image forming apparatus 10 and changing the state of the power supply to the second power-off state, therefore, the processor 34 makes the above suggestion. That is, the processor 34 suggests to the user that the error be registered as one that can be eliminated by changing the state of the power supply to the first power-off state (i.e., a non-fast activation error). Because the error of no network connection might be eliminated by changing the state of the power supply to the first power-off state, "Yes" is associated as the information indicating whether a change may be made.

For example, the processor 34 displays, on the display device 20, a message, "Register the error of no network connection as a non-fast activation error?", as the suggestion.

If the user operates, in response to the suggestion, the UI 18 or the like to accept the change (e.g., presses an OK button), the processor 34 changes the error of no network connection to a non-fast activation error from a fast activation error on the error management table. That is, the processor 34 changes the information indicating whether a change may be made from "Yes" to "No" for the error of no network connection. As a result, when the error of no network connection occurs the next time and the user performs an operation for turning off the image forming apparatus 10, the processor 34 changes the state of the power supply to the first power-off state. As a result, the programs are restarted, and the error of no network connection is eliminated.

Errors whose error codes are "001-001" to "002-004" are ones that cannot be eliminated by changing the state of the power supply to the first power-off state. When one of these errors occurs, therefore, the processor 34 does not suggest to the user that the error be registered as one that can be eliminated by changing the state of the power supply to the first power-off state. For example, the processor 34 does not display the above message on the display device 20. When one of the errors whose error codes are "001-001" to "002-004" occurs and an operation for turning off the image forming apparatus 10 is performed, therefore, the power supply enters the second power-off state. As a result, fast activation is achieved.

Each of the functions of the image forming apparatus 10 is achieved, for example, through cooperation between hardware and software. Each of the functions of the image forming apparatus 10 is achieved, for example, when the processor 34 of the image forming apparatus 10 reads a program stored in the memory 30 and executes the program. The program is stored in the memory via a storage medium such as a compact disc (CD) or a digital versatile disc (DVD) or a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:

a processor, wherein a first power-off state, which accompanies a reset of hardware and a restart of a program, and a second power-off state, which does not accompany the reset of the hardware and the restart of the program, are defined as states of a power supply of the information processing apparatus, and wherein the processor is configured to change, if an operation for turning off the information processing apparatus is performed after an error occurs in the information processing apparatus, a state of the power supply to the first power-off state or the second power-off state in accordance with a type of error that has occurred in the information processing apparatus.

(((2)))

The information processing apparatus according to (((1))), wherein the processor is configured to:

change the state of the power supply to the first power-off state if an error that has occurred in the information processing apparatus is an error that can be eliminated by changing the state of the power supply to the first power-off state; and change the state of the power supply to the second power-off state if an error that has occurred in the information processing apparatus is an error that cannot be eliminated by changing the state of the power supply to the first power-off state.

(((3)))

The information processing apparatus according to (((1))) or (((2))), wherein the processor is configured to change the state of the power supply to the first power-off state if an operation for turning off the information processing apparatus is performed after an error that can be eliminated by changing the state of the power supply to the first power-off state and an error that cannot be eliminated by changing the state of the power supply to the first power-off state occur in the information processing apparatus.

(((4)))

The information processing apparatus according to any one of (((1))) to (((3))), wherein the processor is configured to suggest, if an error that can be eliminated by changing the state of the power supply to the first power-off state has successively occurred in the information processing apparatus, to a user that the state of the power supply be changed to the second power-off state even if an error that can be eliminated by changing the state of the power supply to the first power-off state occurs, in accordance with a condition of operations for turning off and on the information processing apparatus.

(((5)))

The information processing apparatus according to any one of (((1))) to (((4))), wherein the processor is configured to suggest, if an error that has occurred in the information processing apparatus is an error with which the information processing apparatus can perform a process with the power supply in the second power-off state, to the user that the state of the power supply be changed to the second power-off state even if an error that can be eliminated by changing the state of the power supply to the first power-off state occurs.

(((6)))

The information processing apparatus according to any one of (((1))) to (((5))), wherein the processor is configured to suggest, if an error registered as an error for which the power supply is to enter the second power-off state after an operation for turning off the information processing apparatus is performed occurs but the error is not eliminated by changing the state of the power supply to the second power-off state, to the user that the error be registered as an error that can be eliminated by changing the state of the power supply to the first power-off state.

(((7)))

A program causing a computer that controls an apparatus for which a first power-off state, which accompanies a reset of hardware and a restart of a program, and a second power-off state, which does not accompany the reset of the hardware and the restart of the program, are defined as states of a power supply to execute a process comprising:

changing, if an operation for turning off the apparatus is performed after an error occurs in the apparatus, a state of the power supply to the first power-off state or the second power-off state in accordance with a type of error that has occurred in the apparatus.

What is claimed is:

1. An information processing apparatus comprising:

a processor, wherein a first power-off state, which accompanies a reset of hardware and a restart of a program, and a second power-off state, which does not accompany the reset of the hardware and the restart of the program, are defined as states of a power supply of the information processing apparatus, and wherein the processor is configured to:

change, if an operation for turning off the information processing apparatus is performed after an error occurs in the information processing apparatus, a state of the power supply to the first power-off state or the second power-off state in accordance with a type of the error that has occurred in the information processing apparatus;

change the state of the power supply to the first power-off state if the error that has occurred in the information processing apparatus is an error that can be eliminated by changing the state of the power supply to the first power-off state; and change the state of the power supply to the second power-off state if the error that has occurred in the information processing apparatus is an error that cannot be eliminated by changing the state of the power supply to the first power off state.

2. The information processing apparatus according to claim 1, wherein the processor is configured to change the state of the power supply to the first power-off state if the operation for turning off the information processing apparatus is performed after an error that can be eliminated by changing the state of the power supply to the first power-off state and an error that cannot be eliminated by changing the state of the power supply to the first power-off state occur in the information processing apparatus.

3. The information processing apparatus according to claim 1, wherein the processor is configured to suggest, if an error that can be eliminated by changing the state of the power supply to the first power-off state has successively occurred in the information processing apparatus, to a user that the state of the power supply be changed to the second power-off state even if an error that can be eliminated by changing the state of the power supply to the first power-off state occurs, in accordance with a condition of operations for turning off and on the information processing apparatus.

4. The information processing apparatus according to claim 3, wherein the processor is configured to suggest, if the error that has occurred in the information processing apparatus is an error with which the information processing apparatus can perform a process with the power supply in the second power-off state, to the user that the state of the power supply be changed to the second power-off state even if an error that can be eliminated by changing the state of the power supply to the first power-off state occurs.

5. The information processing apparatus according to claim 1, wherein the processor is configured to suggest, if an error registered as an error for which the power supply is to enter the second power-off state after the operation for turning off the information processing apparatus is performed occurs but the error is not eliminated by changing the state of the power supply to the second power-off state, to the user that the error be registered as an error that can be eliminated by changing the state of the power supply to the first power-off state.

6. A non-transitory computer readable medium storing a program causing a computer that controls an apparatus for which a first power-off state, which accompanies a reset of hardware and a restart of a program, and a second power-off state, which does not accompany the reset of the hardware and the restart of the program, are defined as states of a power supply to execute a process comprising:

changing, if an operation for turning off the apparatus is performed after an error occurs in the apparatus, a state of the power supply to the first power-off state or the second power-off state in accordance with a type of the error that has occurred in the apparatus;

changing the state of the power supply to the first power-off state if the error that has occurred in the apparatus is an error that can be eliminated by changing the state of the power supply to the first power-off state; and changing the state of the power supply to the second power-off state if the error that has occurred in the apparatus is an error that cannot be eliminated by changing the state of the power supply to the first power-off state.

7. A method used by an apparatus for which a first power-off state, which accompanies a reset of hardware and a restart of a program, and a second power-off state, which does not accompany the reset of the hardware and the restart of the program, are defined as states of a power supply, the method comprising:

changing, if an operation for turning off the apparatus is performed after an error occurs in the apparatus, a state of the power supply to the first power-off state or the second power-off state in accordance with a type of the error that has occurred in the apparatus;

changing the state of the power supply to the first power-off state if the error that has occurred in the apparatus is an error that can be eliminated by changing the state of the power apply to the first power off state; and changing the state of the power supply to the second power off state if the error that has occurred in the apparatus is an error that cannot be eliminated by changing the state of the power supply to the first power-off state.

* * * * *